(12) United States Patent  
Ioi et al.

(10) Patent No.: US 7,019,430 B2
(45) Date of Patent: Mar. 28, 2006

(54) ELECTRIC MOTOR

(75) Inventors: Nobuyasu Ioi, Motosu-gun (JP); Shinichi Ogawa, Obu (JP)

(73) Assignee: DENSO Corporation, Kariya (JP)

( * ) Notice: Subject to any disclaimer, the term of this patent is extended or adjusted under 35 U.S.C. 154(b) by 0 days.

(21) Appl. No.: 10/425,792

(22) Filed: Apr. 28, 2003

(65) Prior Publication Data

US 2003/0205945 A1 Nov. 6, 2003

(30) Foreign Application Priority Data

May 1, 2002 (JP) .............................. 2002-129966

(51) Int. Cl.
*H02K 1/00* (2006.01)

(52) U.S. Cl. .................................................... 310/216

(58) Field of Classification Search ................ 310/216, 310/215, 218, 42, 254, 261; 29/596–598; 252/67; 62/144
See application file for complete search history.

(56) References Cited

U.S. PATENT DOCUMENTS

| 4,274,025 | A | * | 6/1981 | Nerurkar et al. ............ 310/215 |
| 5,998,903 | A | | 12/1999 | Umeda et al. |
| 6,208,060 | B1 | * | 3/2001 | Kusase et al. .............. 310/254 |
| 6,417,592 | B1 | * | 7/2002 | Nakamura et al. .......... 310/184 |
| 6,559,572 | B1 | * | 5/2003 | Nakamura .................. 310/254 |

FOREIGN PATENT DOCUMENTS

| JP | 8-070544 | 3/1996 |
| JP | 11-155270 | 6/1999 |

* cited by examiner

*Primary Examiner*—Tran Nguyen
(74) *Attorney, Agent, or Firm*—Harness, Dickey & Pierce, PLC (57) ABSTRACT

An electric motor in which magnetic steel sheets and stator end plates are laminated, wherein notches are formed in slot portions in the stator end plates to prevent part of conductive segments coming into direct contact with the stator end plates or the like, when cracks appear in the insulation paper when the conductive segments comprising flat copper wire forming a coil are inserted into the slot portions formed in a stator core and leg portions protruding from the slot portions are being folded.

18 Claims, 5 Drawing Sheets

ELECTRIC MOTOR

BACKGROUND OF THE INVENTION

1. Field of the Invention

The present invention relates to an electric motor, and in particular, to an improved structure for maintaining the insulation of the windings provided in the stator of an electric motor.

2. Description of the Related Art

Figure 5A:
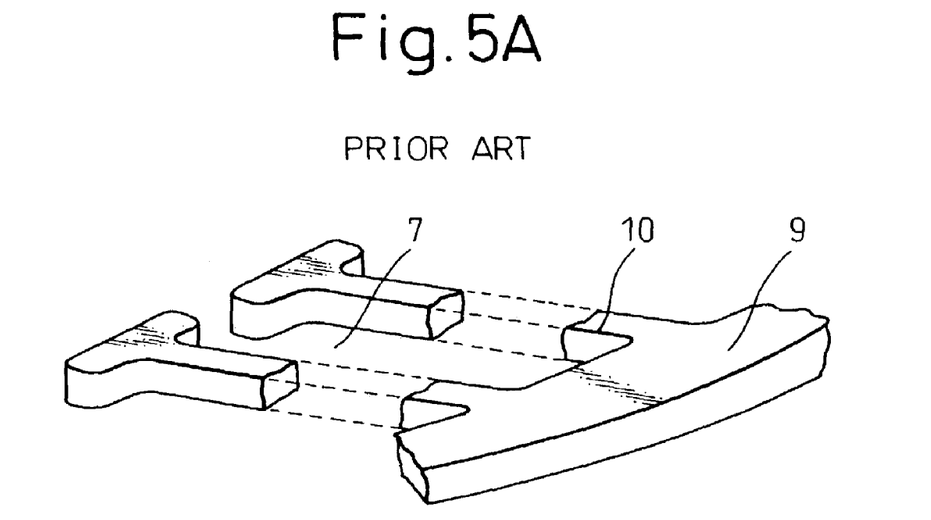
FIG. 5A and FIG. 5B are exploded perspective views showing a first prior art example.
Figure 5B:
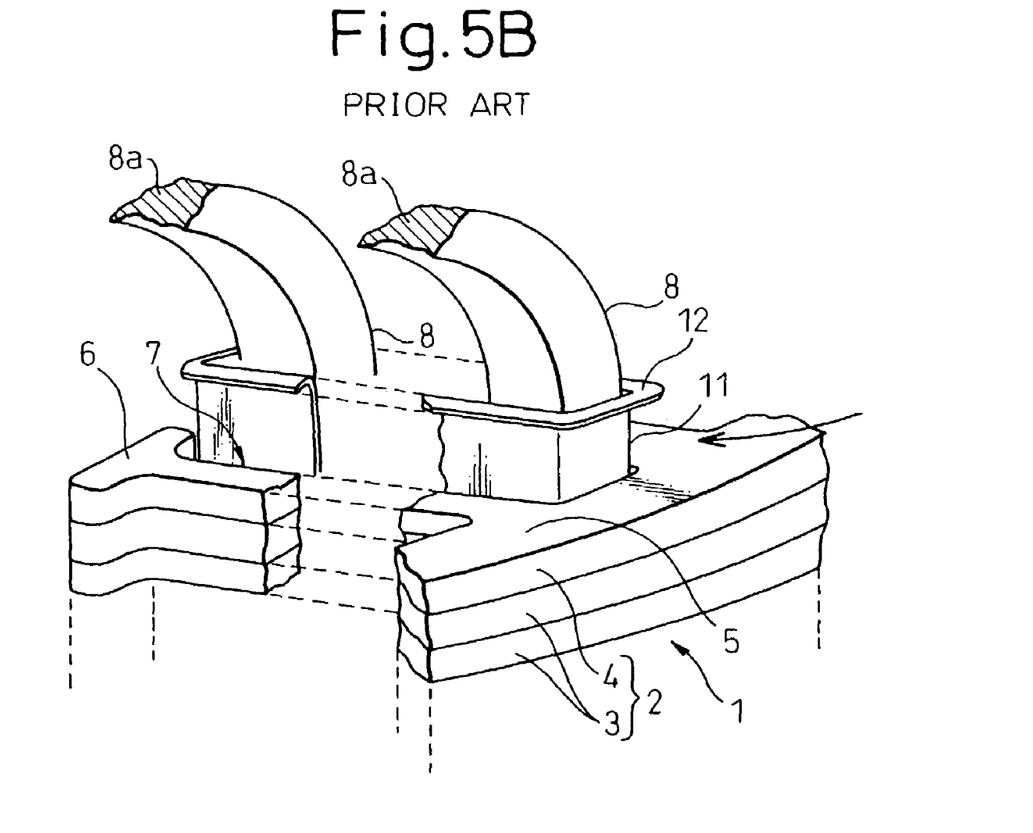

As shown in FIG. 5B, generally, the core 2 of the stator 1 of an electric motor is constructed by laminating a plurality of thin magnetic steel sheets 3 punched into a predetermined shape to a required thickness and by laminating stator end plates 4 formed from iron sheets having the same shape as that of the thin magnetic steel sheets 3 but whose thickness is slightly greater than that of the magnetic steel sheets 3, at both ends of the laminate. In the prior art example shown in FIG. 5B, the stator core 2, which is the laminate of the magnetic steel sheets 3 and stator end plates 4, comprises an annular yoke portion 5 and a plurality of toothed portions 6 protruding radially inward from the yoke portion 5, forming a slot portion 7 between each two adjacent toothed portions 6.

When the windings (coil) of the stator core 2 have been formed, rather than using copper wire whose cross-section is circular, if a so-called flat copper wire whose cross-section is rectangular (including square) is used, the space factor of the strands of the coil can be increased. Although, normally, the surface of flat copper wire is coated with an insulating resin such as polyamide-imide, it is difficult to insert the flat copper wire into the narrow slot portion 7 and wind it around the toothed portions 6 of the stator core 2, and the method of fitting the coils of each externally wound toothed portion 6 into each toothed portion 6 in a mutually continuous state is also difficult given that the toothed portions 6 are formed inward in the radial direction, the coil is formed from flat copper wire, and the gap in the slot portion 7 is narrow.

In order to solve this problem, in the invention of an AC motor for automotive use registered as U.S. Pat. No. 2,927,288 (Unexamined Japanese Patent Application No. 11-155270 and U.S. Pat. No. 5,998,903), filed by the applicants of the present invention, the flat copper wire whose length is determined as a multiple of the thickness of the laminated stator core 2 is folded at the central portion, a U-shaped conductive segment (also known as a segment conductor) 8 is formed, two leg portions 8a and 8b in each of the plurality of conductive segments 8 are inserted into the slot portion 7 from the direction of one of the stator end plates 4 so that they extend between two slot portions 7 such that the two slot portions 7 are adjacent to each other in the stator core 2, and the leg portions 8a and 8b of the conductive segment 8 protruding from the slot portion 7 in the other stator end plate 4 are folded so that they fall in the same direction as the circumferential direction by means of a jig or the like. Also, with regard to other sets of conductive segments 8 inserted in other adjacent radial positions in each slot portion 7, the leg portions 8a and 8b of those conductive segments 8 are folded so that they fall in the opposite direction to the circumferential direction. In addition, by bringing into contact and welding those portions of the ends of the leg portions 8a and 8b of the radially adjacent conductive segments 8 from which the insulation coating has been removed, a continuous coil is formed.

When such a winding method is employed, there is the possibility that the conductive segments 8 formed from flat copper wire come into direct contact with the edge of the slot portions 7 of the stator end plates 4 when the leg portions 8a and 8b of the conductive segments 8 are folded, and the coating of the flat copper wire at the edge portions or the like is damaged and the insulation is reduced. As a method for eliminating this problem, as shown in FIG. 5A, a method of integrating a coating 9 of synthetic resin having the same shape as the stator end plates 4 by molding it in the position indicated by the arrow, and as well as forming a smooth curved face on the edges 10 of the coating 9 forming opening portions in the slot portions 7 of the stator core 2, inserting tubular insulation paper 11 having a shape that covers most of the interface of the slot portions 7 to maintain insulation between the conductive segments 8 and the stator end plates 4 and the like has been considered. Further, although not utilizing flat copper wire, there are examples where flanges 12 are formed on the end portions of the tubular insulation paper 11 for protecting the coil, and the flanges 12 are brought into contact and engaged with the edges 10 of the coating 9, thus preventing damage to the insulation coating of the coil by the edges 10.

In a case where the means shown in FIG. 5A are employed, given the increase in cost due to molding the synthetic resin coating 9 on the stator end plates 4, it becomes necessary to investigate the suitability of the synthetic resin used as the coating 9 and the usage of the electric motor. For example, where the electric motor is used as the electric motor portion of an electric compressor, and the compressor portion is used as a refrigerant compressor of an air conditioning system, it is necessary to confirm beforehand that there is no possibility of the synthetic resin material of the coating 9 being contaminated by the various types of refrigerating machine oils, refrigerants, and the like which could possibly be used in the air conditioning system. Not only does the development time of the electric compressor thereby increase, but there is also the problem of an over-expenditure occurring as a result.

Figure 6:
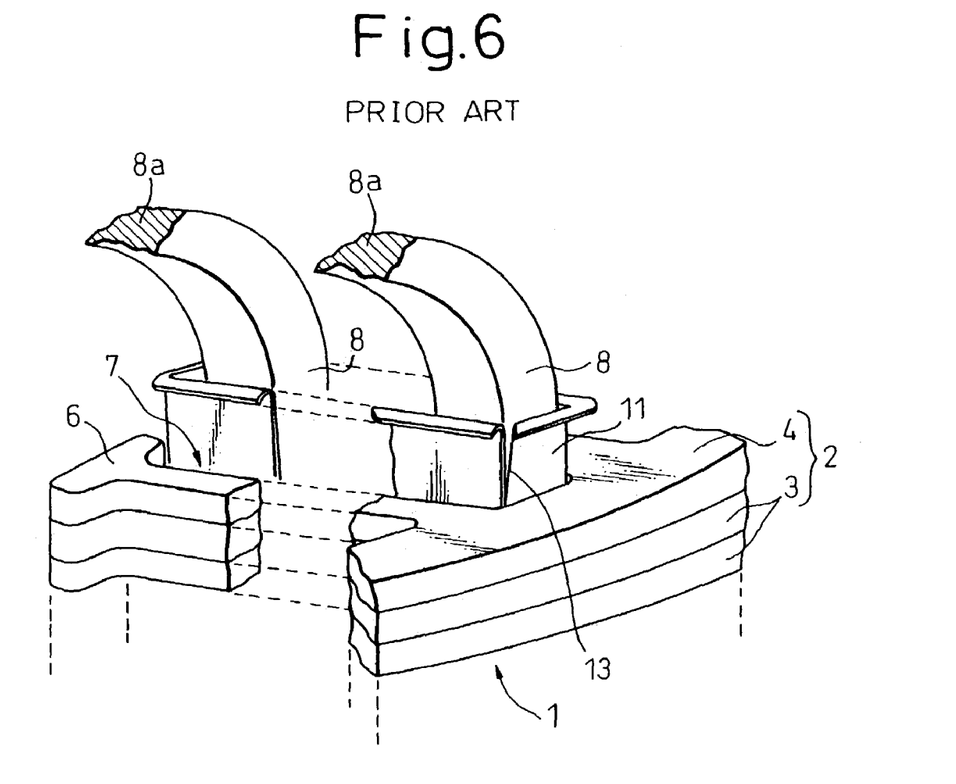
FIG. 6 is an exploded perspective view showing a second prior art example

Also, as in the stator 1 shown in FIG. 6, if only a normal insulation paper 11, formed from an inexpensive elastic synthetic resin material such as PET (polyethylene terephthalate), polyamide or the like, is used as shown in FIG. 5B, without using the coating 9 formed from a synthetic resin as shown in FIG. 5A, and the insulation paper 11 copes with an HFC type refrigerant such as R1134a or the like generally used in air-conditioning systems. In the case of PET, an oligomer is extracted and flows into the refrigerant, accumulates in expansion valves in the refrigeration cycle of the air-conditioning system or portions, such as a screen mesh attached to driers where passages are narrow, and in the worst case giving rise to blockages of the refrigeration cycle. Also, in the case of polyamide paper, because this has a high absorption, there is a problem in that it reduces the insulation of the windings.

Consequently, as a material of the tubular insulation paper 11 as shown in FIG. 6, although it is necessary to use a material whose durability to refrigeration has already been confirmed, such as PEN (polyethylene naphthalate) or PPS (polyphenylene sulfide). However the elasticity of these materials is small, and hence, when the leg portions 8a and 8b of the conductive segments 8 formed from flat copper wire are folded, cracks can occur as indicated by the reference numeral 13, whereby the conductive segment 8 is exposed through the insulation paper 11, comes into contact with the stator end plate 4, and the insulation coating of the conductive segment 8 peels off, as a result of which insulation performance is reduced.

SUMMARY OF THE INVENTION

The present invention, in light of the prior art problems described above, has as its object provision of a means for maintaining the insulation between conductive segments comprising flat copper wire and a stator core including stator end plates, by a very simple means that does not require the addition of new materials or components that would incur an increase in cost.

The present invention, as a means for resolving these problems, provides an electric motor in which a plurality of conductive segments formed from flat copper wire are inserted in slot portions formed in the core of a stator, and a coil is constructed by joining different conductive segment leg portions that are brought into contact by folding the leg portions of the conductive segments protruding from the slot portion, characterized in that notches are formed in positions facing edge portions of the flat copper wire of the slot portions in the stator end plates laminated as part of the core of the stator.

In the electric motor of the present invention, because notches are formed in parts of the slot portions in the stator end plates laminated as at least part of the core of the stator, when the leg portions of the conductive segments inserted in the slot portion of the core are folded in order to form the coil of the stator core, even if parts of the conductive segments expand towards the inside, those parts merely protrude leaving a gap in the notches formed in the stator end plates and, therefore, part of the conductive segments can be prevented from coming into direct contact with the core of the stator. Consequently, the insulation coating of the conductive segments can be prevented from peeling off due to such contact and reducing the insulation.

In the electric motor of the present invention, normally, the widths of the slot portions formed in the stator core are often widths that only allow for insertion of one of the conductive segments and, therefore, in such a case, the notches provided according to the feature of the present invention need only be formed in one corner of the bottom of the slot portion in at least the stator end plate.

In the electric motor of the present invention, an insulation paper formed from PEN (polyethylene naphthalate), PPS (polyphenylene sulfide) or the like is installed between the core of the stator and the slot portions formed in stator end plates so that insulation between these can be increased. As PEN and PPS have excellent durability against HFC type refrigerants, the electric motor of the present invention, when using such insulation paper, is suitable for use as an electric motor integrated with a coolant compressor in a conditioning system. On the other hand, because PEN and PPS have a limited elasticity, cracks occur easily, but because the notches which are the feature of the present invention are formed in the slot portions, even when cracks occur there is no possibility of part of the conductive segments coming into direct contact with the stator core and the necessary installation is maintained.

In this way, the electric motor of the present invention can generally be used in an electric compressor by integrating it with a compressor.

DETAILED DESCRIPTION OF THE PREFERRED EMBODIMENTS

Next, referring to the enclosed drawings (FIG. 1 to FIG. 4), an example of an electric compressor wherein the electric motor of the present invention is integrated with a compressor will be explained, in detail, as a preferred embodiment. The same reference numerals as are used in the prior art examples described above will be used for essentially the same portions in the embodiment shown in the drawings. FIG. 3 shows the overall structure of the electric compressor 14 as an embodiment of the present invention. The electric compressor 14 is one in which a scroll type compressor portion 15 shown on the left side of FIG. 3 is integrated with a drive type electric motor portion 16 occupying the majority of the remainder of the drawing, so that it can be used as a refrigerant compressor for an automotive air-conditioning system. Although the compressor portion 15 in FIG. 3 itself is shown as a well-known scroll type compressor, the feature of the present invention is not the structure of the compressor portion 15 and a compressor portion 15 other than a scroll type compressor such as a swash plate compressor, movable vane compressor or the like can be used. An explanation of the internal structure of the compressor portion 15 will be omitted.

The housing 17 of the compressive portion 15 and the housing 18 of the electric motor portion 16 are integrated by means such as through bolts and, as well as part of the internal space thereof being in mutual communication, the internal spaces are sealed from the outside air. A rotation shaft 19 extending along a central axis of the electric motor portion 16, as well as extending to the inside of the housing 17 of the compressor portion 15, is linked to a drive side member such as a crank shaft 20 of the compressor portion 15. The rotation shaft 19 is received at the front and rear portions by a bearing 21 supported by the housing 18 of the electric motor portion 16 and a bearing 22 supported by the housing 17 of the compressor portion 15.

A rotor 23 having a cylindrical external shape with the same axis as the rotation shaft 19 is integrally rotatably attached thereto using a key 24 or the like, and the external circumference thereof faces the ends of the toothed portions 6 of the stator 1 with a slight space in between. The rotor 23 is made up of a plurality of laminated thin magnetic steel sheets, with a plurality of permanent magnets uniformly attached to the periphery thereof. Needless to say, this is in a case where the electric motor portion 16 is constructed as a permanent magnet motor, and in a case where the electric motor portion 16 is constructed as an induction motor, it is not necessary to provide the permanent magnets in the rotor 23. If an electric motor of a type having a coil 25 formed from flat copper wire as described above in the stator 1 serves as the electric motor portion 16, it need not be limited to a permanent magnet motor or induction motor, but another type of electric motor may also be used.

Figure 1:
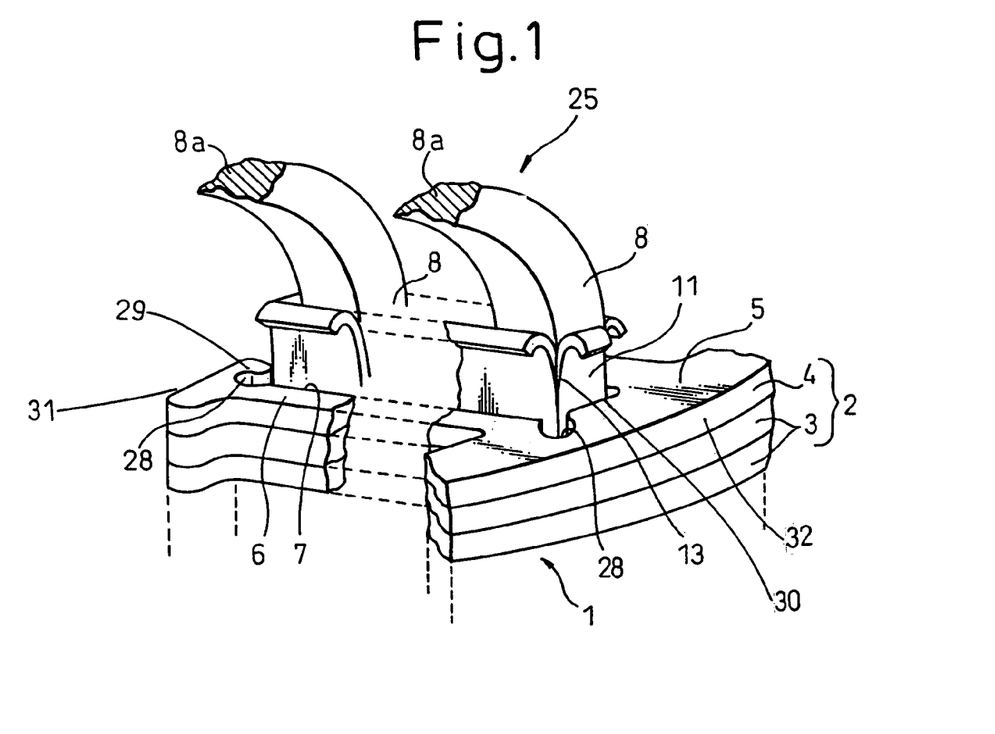
FIG. 1 is a perspective view showing an enlarged portion of the electric motor of the present invention.

The main parts of the present embodiment are shown in FIG. 1. As can be seen by referring to FIG. 1 and FIG. 4 together with the above explanation relating to FIG. 5A to FIG. 7 showing the prior art, the stator core 2, formed from the laminated magnetic steel sheets 3 punched into predetermined shapes and the stator end plates 4 of the same shape and laminated at each end thereof, comprises an annular yoke portion 5 and a plurality of toothed portions 6 protruding inward in the radial direction, with slot portions 7 formed in the radial direction between adjacent toothed portions 6.

Figure 2:
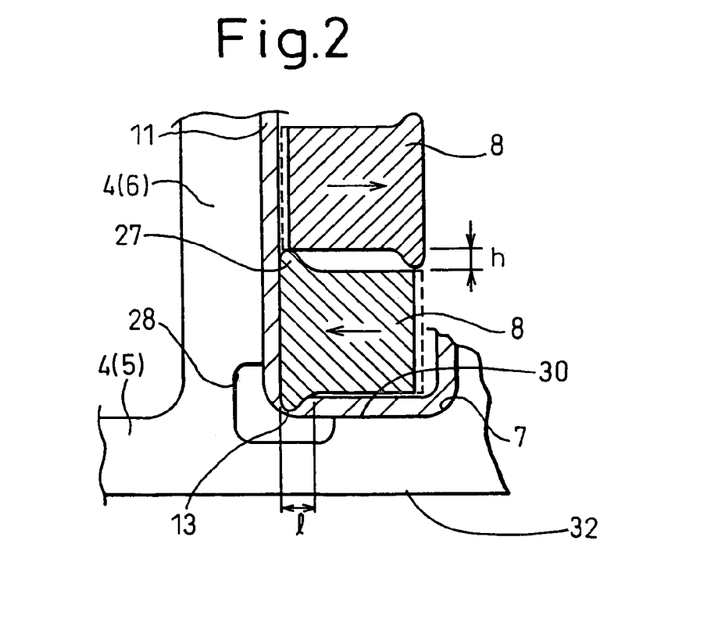
FIG. 2 is a transverse sectional view showing a further enlargement of a principal portion of FIG. 1.
Figure 3:
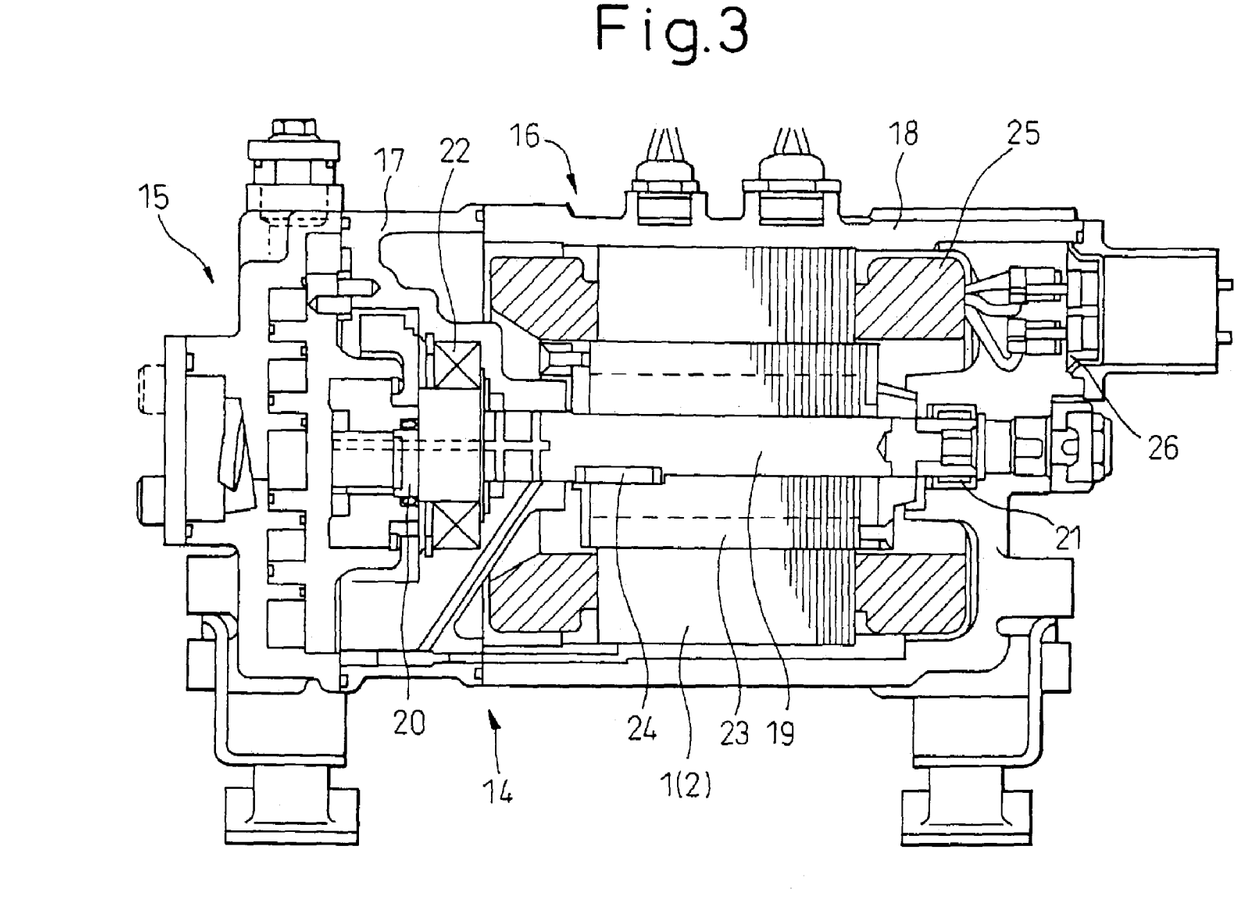
FIG. 3 is a longitudinal sectional view of an electric compressor as an embodiment of the present invention.
Figure 4:
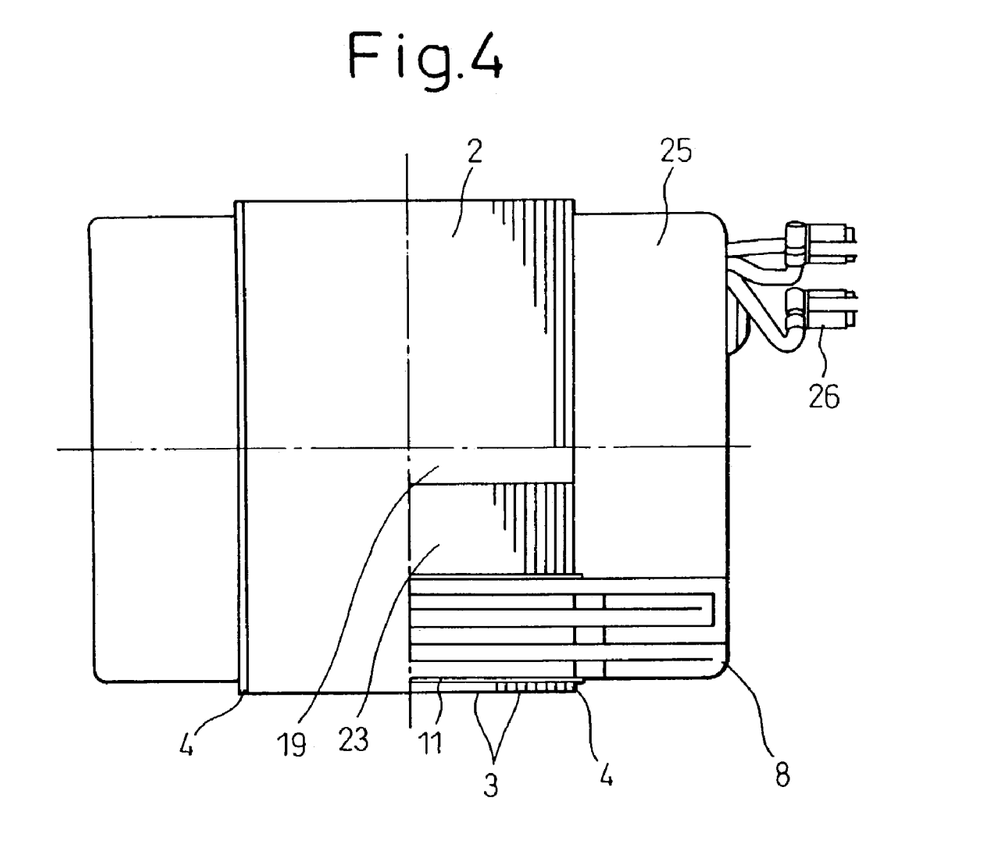
FIG. 4 is a partial longitudinal sectional view of an electric motor portion of the electric compressor shown in FIG. 3.
Figure 7:
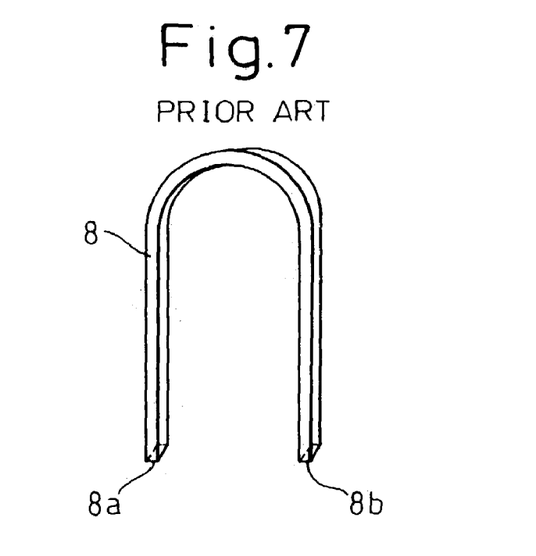
FIG. 7 is a perspective view showing a conductive segment.

The windings which are flat copper wires whose surfaces are coated with an insulation resin such as polyamide-imide have a length that is determined as a multiple of the thickness of the stator core 2 and, as well as the insulation coating at the ends of the two leg portions being peeled off, the plurality of conductive segments 8 whose central portions are bent into a U shape as shown in FIG. 7 have their two leg portions 8a and 8b inserted into the slot portions 7 from the direction of one of the stator end plates 4 so that they extend over two slot portions 7 of the stator core 2, the leg portions 8a and 8b (only 8a is shown in the drawing) of the conductive segment 8 protruding from the other stator end plate 4 are folded using a jig or the like so that those on the same circumference all face the same direction, and the leg portions 8a and 8b of the other sets of conductive segments 8 inserted adjacent to each other in slot portions 7 are folded so that they all face in the opposite direction on a separate concentric circumference having a different diameter to that previously described, as indicated by the arrow in FIG. 2.

As a result, a plurality of contact portions are defined by contact between the adjacent front ends of the legs 8a or 8b of the conductive segments 8 on different circumferences. Therefore, by welding these contact portions, at least three coils 25 are defined by a plurality of conductive segments 8 which are continuously wound around the toothed portions 6 of the stator core 2. Also, a three-phase alternating current can be supplied from an automotive battery and an inverter, not shown in the drawing, via a hermetic terminal 26, to these coils 25.

Due to the conductive segments 8 formed from flat copper wire being in contact with the edges and the like of the stator end plates 4, in order to avoid a reduction in insulation when the coating of the flat copper wire peels off, although measures such as inserting the tubular or similarly shaped insulation paper 11 formed from an erosion proof material with respect to refrigerants such as PEN and PPS into the slot portion 7 beforehand to cover the inner surface can be taken. However, for example, when the end portions of the conductive segments 8 are folded, bulges as indicated by the reference numeral 27 in FIG. 2 occur at the edge portions of the conductive segments 8. These push strongly on part of the insulation paper 11 and, hence, cracks 13 occur in the insulation paper 11 and the bulges 27 come into direct contact with the edges of the stator end plates 4, there is the possibility that the coatings in those portions will peel off, and the insulation be reduced.

In order to solve this problem, in the embodiment shown in the drawings, as shown in FIG. 1 and FIG. 2, a notch 28 is formed as a gap in part of the slot portion 7 of the stator end plate 4 which is the uppermost layer in the stator core 2. The leg portions 8a and 8b which are the protruding portions of the outermost conductive segment 8 positioned at the bottom of the slot portion 7 are folded in any one of the circumferential directions of the stator core 2 and, therefore, the notch 28 is formed only in 1 corner portion at the bottom of the slot portion 7 corresponding to the inside of the folded leg portions 8a and 8b of the conductive segment 8. If long bulges 27 in the conductive segments 8 or long cracks 13 in the insulating paper 11 occur, although notches can be similarly provided not only in the stator end plates 4 but also in 2 or 3 of the upper layers among the laminated magnetic steel sheets 3, and as the effective magnetic circuit is reduced and a slight decrease in the effectiveness of the electric motor occurs when notches are provided in the laminated magnetic steel sheets 3, normally the notches 28 are provided only in the stator end plates 4, which are slightly thicker than the magnetic steel sheets 3. As shown in FIG. 2, an inner notch 28 extends radially inward from an inner edge 29 of slot portion 7 and an outer notch 28 extends radially outward from an outward edge 30 of slot portion 7. Thus, the radially inner notch 28 extends to a position closer to a circumferential inner edge 31 of stator end plate 4 and the radially outer notch 28 extends closer to a circumferential outer edge 32 of stator end plate 4.

Specifically, if the sizes of the notches 28 formed in the stator end plates 4 are exemplified by their diameters due to the shape of the notches 28 generally being circular, with the cross sectional dimensions of the conductive segments 8 formed from flat copper wire being a rectangular shape of A (long side)×B (short side), where a bulge 27 occurs along the long side, the height h thereof is a maximum of 10 to 15% of the long side A, the length 1 along the short side is 13 to 17% of the short side B, and the thickness of the insulation paper 11 is 9 to 13% of the long side A, the diameter of the notch 28 can be on the order of 20 to 33% of the long side A. If the notch 28 becomes excessively large and increases to a portion exceeding one-third of the long side in the embodiment shown in the drawings, not only does the mechanical strength of the stator end plates 4 decrease, but the conductive segments 8 cannot be supported when the end portions of the conductive segments 8 formed from flat copper wire are being folded.

By providing the notches 28 in the stator end plates 4 in the embodiment shown in the drawings, when the leg portions 8a and 8b of the conductive segments 8 formed from flat copper wire are folded, even if cracks 13 occur in part of the insulation paper 11 formed from PEN, PPS or the like having limited elasticity due to bulges 27 protruding on the inside of the folded portions, direct contact between part of the conductive segments 8 and the inner surface of the slot portion 7 of the stator core 2 can be avoided, due to the notch 28 leaving a gap and receiving the protruding portion, therefore damage to the insulating coating on the surface of the conductive segments 8 and a reduction in the insulation can be prevented.

The invention claimed is:

1. An electric motor, wherein a plurality of conductive segments formed from flat copper wire are inserted in slot portions formed in a core of a stator, and a coil is constructed by joining different conductive segment leg portions that are brought into contact by folding leg portions of the conductive segments protruding from the slot portions, characterized in that notches are formed in positions facing edge portions of the flat copper wire of the slot portions in stator end plates laminated as part of the core of the stator, and wherein an insulation paper is inserted between the conductive segments and the slot portions formed in the core of the stator including the stator and plates, and wherein at corner portions, in the direction wherein the conductive segments are folded, of the corner portions of the slot portion, notches are formed to extend to at least one of a first position radially outward from an outer edge of the slot portions and a second position radially inward from an inner edge of the slot portions.

2. The electric motor according to claim 1, wherein the notches are formed only in one corner of a lower portion of the slot portion in the stator end plates.

3. The electric motor according to claim 1, wherein the insulation paper is formed from one of polyethylene naphthalate and polyphenylene sulfide.

4. The electric motor according to claim 1, wherein the electric motor forms part of an electric compressor by being integrated with a compressor portion.

5. The electric motor according to claim 1, wherein the diameter of the notch is on the order of 20 to 33% of the long side (A).

6. The electric motor according to claim 1, wherein the electric motor is used in refrigerant of a refrigerating cycle.

7. The electric motor according to claim 1, wherein the notches extend only to the first position.

8. The electric motor according to claim 1, wherein the notches extend only to the second position.

9. The electric motor according to claim 1, wherein the notches extend to both the first and second position.

10. An electric motor, wherein a plurality of conductive segments formed from flat copper wire are inserted in slot portions formed in a core of a stator, and a coil is constructed by joining different conductive segment leg portions that are brought into contact by folding leg portions of the conductive segments protruding from the slot portions, characterized in that notches are formed in positions facing edge portions of the flat copper wire of the slot portions in stator end plates laminated as part of the core of the stator, and wherein an insulation paper is inserted between the conductive segments and the slot portions formed in the core of the stator including the stator and plates, and wherein at corner portions, in the direction wherein the conductive segments are folded, of the corner portions of the slot portion, notches are formed to extend in a radial direction, which is perpendicular to a circumferential direction of the stator core, the slot portions defining an inner edge and an outer edge, the notches extending to a position closer to a circumferential edge of the stator core than one of the inner edge and the outer edge of the slot portions.

11. The electric motor according to claim 10, wherein the notches are formed only in one corner of a lower portion of the slot portion in the stator end plates.

12. The electric motor according to claim 10, wherein the insulation paper is formed from one of polyethylene naphthalate and polyphenylene sulfide.

13. The electric motor according to claim 10, wherein the electric motor forms part of an electric compressor by being integrated with a compressor portion.

14. The electric motor according to claim 10, wherein the diameter of the notch is on the order of 20 to 33% of the long side (A).

15. The electric motor according to claim 10, wherein the electric motor is used in refrigerant of a refrigerating cycle.

16. The electric motor according to claim 10, wherein the notches are formed closer to a circumferential inner edge of the stator core than the inner edge of the slot portions.

17. The electric motor according to claim 16, wherein the notches are formed closer to a circumferential outer edge of the stator core than the outer edge of the slot portions.

18. The electric motor according to claim 10, wherein the notches are formed closer to a circumferential outer edge of the stator core than the outer edge of the slot portions.

* * * * *

UNITED STATES PATENT AND TRADEMARK OFFICE
CERTIFICATE OF CORRECTION

| | |
|---|---|
| PATENT NO. | : 7,019,430 B2 |
| APPLICATION NO. | : 10/425792 |
| DATED | : March 28, 2006 |
| INVENTOR(S) | : Nobuyasu Ioi et al |

Page 1 of 1

It is certified that error appears in the above-identified patent and that said Letters Patent is hereby corrected as shown below:

Col. 6, line 64, claim 1, "and" should be --end--

Col. 8, line 1, claim 10, "and" should be --end--

Signed and Sealed this

Nineteenth Day of September, 2006

JON W. DUDAS
*Director of the United States Patent and Trademark Office*